Jan. 20, 1931. H. W. OSTER ET AL 1,789,412
PORTABLE POWER DRIVEN TOOL
Filed Nov. 8, 1924 2 Sheets-Sheet 1
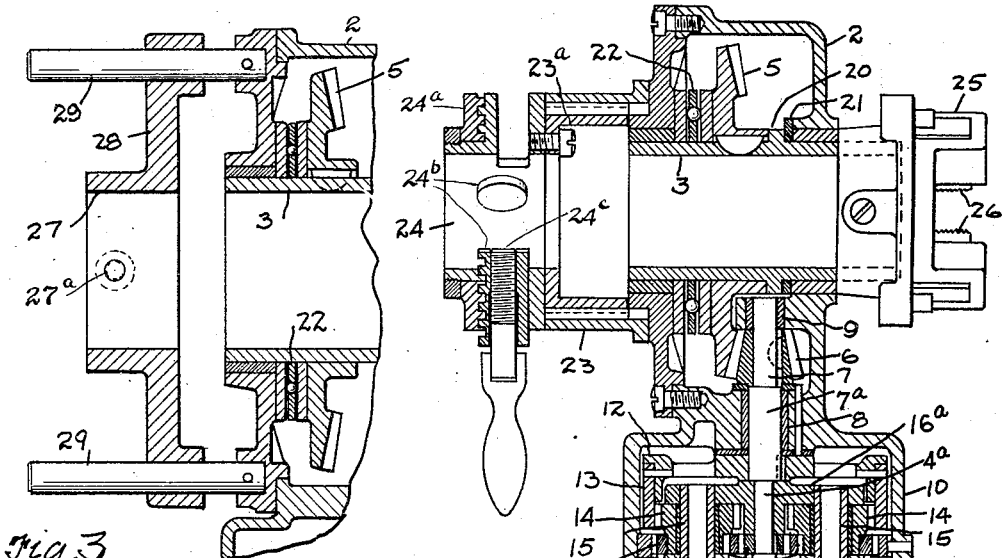
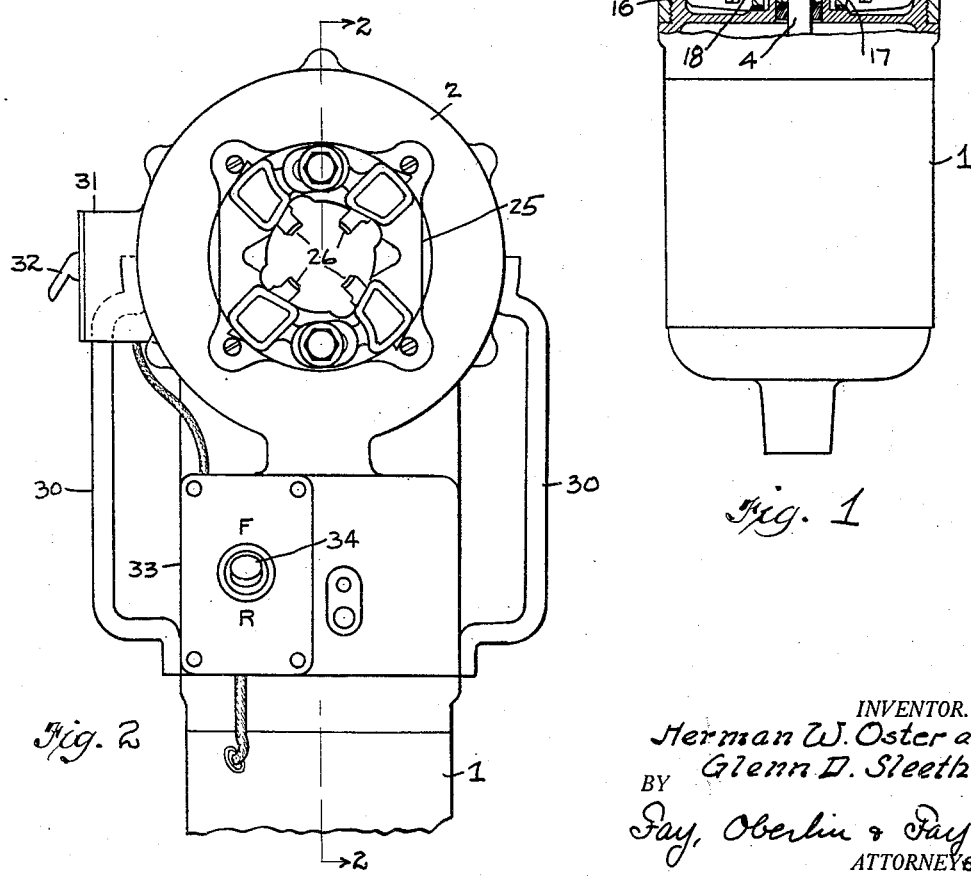
INVENTOR.
Herman W. Oster and
Glenn D. Sleeth
BY
Fay, Oberlin & Fay
ATTORNEYS

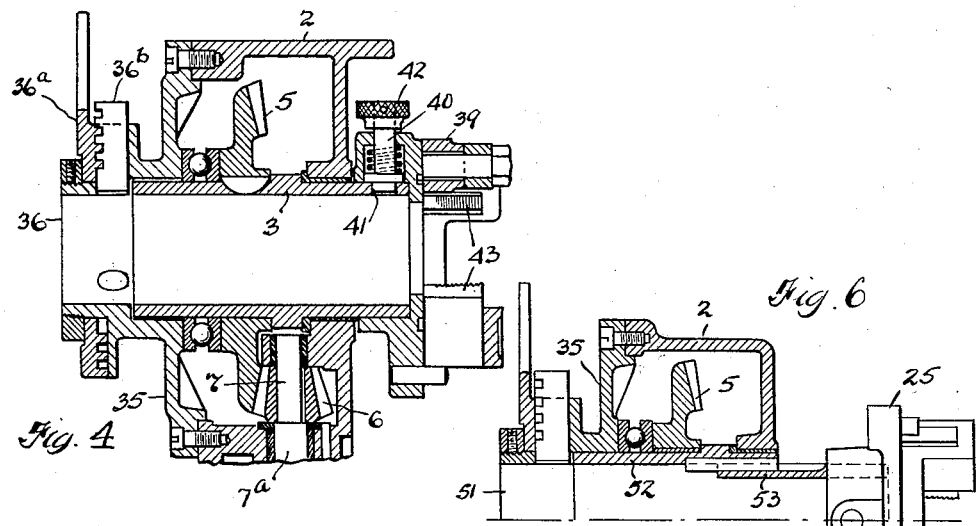
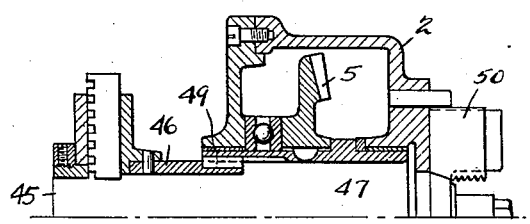
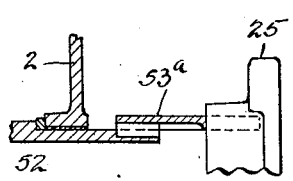
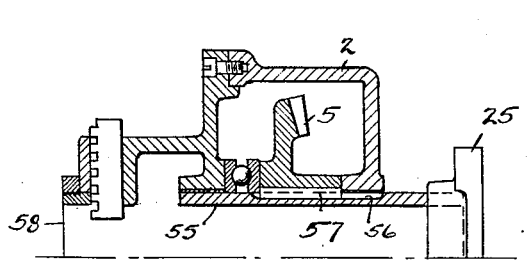
Jan. 20, 1931.   H. W. OSTER ET AL   1,789,412
PORTABLE POWER DRIVEN TOOL
Filed Nov. 8, 1924   2 Sheets-Sheet 2
INVENTORS
Herman W. Oster and
BY Glenn D. Sleeth
Fay, Oberlin & Fay
ATTORNEYS Patented Jan. 20, 1931

1,789,412

UNITED STATES PATENT OFFICE

HERMAN W. OSTER AND GLENN D. SLEETH, OF CLEVELAND, OHIO, ASSIGNORS TO THE OSTER MANUFACTURING COMPANY, OF CLEVELAND, OHIO, A CORPORATION OF OHIO

PORTABLE POWER-DRIVEN TOOL

Application filed November 8, 1924. Serial No. 748,592.

In the construction of a portable power driven threading tool, e. g., a portable tool provided with a power driven die head, it is essential that it be sufficiently compact and light enough to permit its employment in the same manner as the familiar manually operated die stock. An electric motor constitutes the most convenient and usually the only available source of power for driving such a tool and the design of the motor and of the driving connections between such motor and the die head proper presents a further problem in that the cutting speed of the die head, as in any similar machine tool, is determined by the peripheral speed in feet per minute. In other words, where the thread is being cut on a pipe or like article three inches in diameter, a slower speed in revolutions per minute is necessary than where threading a pipe one inch in diameter. The life and cutting qualities of the threading dies are of course determined by the peripheral speed rather than by the actual revolutions per minute of the dies. It accordingly becomes necessary in the design of a portable threading tool of the type in question that the speed at which the die head is rotated be automatically controlled and this we obtain by means of the general characteristics of the universal motor which we employ.

To the accomplishment of the foregoing and related ends, the invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:—

Fig. 1 is partly a central vertical section and partly a side elevation of one form of portable tool embodying our present improvements; Fig. 2 is a broken front elevation of the same as viewed from the right in Fig. 1; and Figs. 3 to 8, inclusive, are broken sectional views corresponding with a part of Fig. 1, but showing modifications in construction.

Referring to the form of construction shown in Figs. 1 and 2, the frame of the mechanism will be seen to comprise two principal parts, namely, a motor housing 1 and a second housing 2 wherein is rotatably mounted a tubular tool carrying shaft 3. The housing 1 is of general cylindrical shape to conform with that of the motor encased therein, only the spindle 4 of the latter being shown in Fig. 1. While an electric motor is thus desirably employed and possesses special advantages, as will be presently more particularly explained, it will be understood that so far as concerns the general assembly of the tool, other forms of power than electricity may be employed, in which event the motor will be similarly disposed with respect to the other parts of the mechanism but will of course take on appropriate form and construction.

The motor spindle 4, it will be noted, lies transversely of the axis of tubular shaft 3 in casing 2 and is radially disposed with respect to such axis. Keyed to the tubular shaft 3 is an annular beveled gear 5 with which meshes a beveled pinion 6 that is keyed to the upper end of a short shaft or spindle 7 aligned with motor spindle 4. Spindle 7 includes an intermediate enlarged portion 7a that is journaled in a suitable bearing 8 in the lower side wall of casing 2, an additional bearing 9 being provided for the upper end of said spindle at a point closely adjacent to the tubular shaft 3, the pinion 6 being mounted on the spindle 7 between these two bearings. The enlarged portion 7a of the spindle projects beyond bearing 8 into a supplemental casing 10 of cylindrical form, to the lower open end of which is secured the upper end of the cylindrical motor housing 1.

The driving connection between the motor spindle and said spindle 7 preferably takes the form of epicyclic reduction gearing of special design, such design by itself constituting no part of the present invention, although such gearing has been specially adapted for use herein. The driven member of such gearing is a spider 12 keyed on the enlarged portion 7a of spindle 7, such portion projecting sufficiently for this purpose within the casing 10. Secured to the periphery of said spider and depending therefrom is an internal annular gear 13 with which mesh a plurality of pinions 14 freely rotatably mounted on corresponding spindles 15 that project upwardly from a carrier 16. The latter is stationarily secured to a central boss 17 on the upper end of motor housing 1 through which extends the motor spindle 4. The portion 4a of motor spindle 4 that projects beyond the said boss 17 is of slightly reduced diameter and is journaled at its free end in a corresponding portion 16a of carrier 16, it being noted that the upper ends of the spindles 15, whereon are mounted pinions 14, are likewise supported in such carrier portion 16a. At an intermediate point such spindle extension 4a has keyed thereto a pinion 18 that meshes with a plurality of pinions 19 corresponding with said pinions 14 and keyed to the hubs of the latter so as to be in effect integral therewith. Pinions 19, however, are of larger diameter than pinions 14 and there is thus obtained a reduction in speed between the driving member, consisting of pinion 18 on the motor spindle, and the driven member 12 on spindle 7, as will be readily understood.

The casing 2, in which tubular shaft 3 is journaled as aforesaid, is of flat cylindrical form, as indicated by its circular elevation as viewed from the front (see Fig. 2). The shaft 3 is formed with an encircling shoulder 20 that is held against a bearing ring 21, interposed between such shoulder and one wall of the casing, a thrust ball bearing 22 being interposed between bevel gear 5 and the other wall of such casing. The latter is removable to permit assembly of the parts and has fixed thereto a projecting shell 23 within which is slidably supported a second shell 23a that is splined thereto and has fixed to its outer end a work engaging device 24. The latter is of the type adapted non-rotatably to engage the work, i. e., it comprises a plurality of radially movable guides 24b that are adjustably positioned by a cam plate 24a, one of said guides having incorporated therein a threaded pin 24c that may be forced into firm engagement with the work.

Fixedly secured to the opposite end of the tubular shaft so as to be rotated thereby is a die stock or die head 25, likewise of standard construction, save that the oppositely extending handles are omitted. It is considered unnecessary for the purpose in hand to describe the details of construction of such head other than to note that it is provided with chaser dies 26 that may be suitably positioned in the head by appropriate adjusting means.

Instead of the adjustable work-engaging device of the type illustrated in Fig. 1, we may employ an interchangeable device as shown in Fig. 3, the same consisting of a ring 27 provided with radial arms 28 that slidably engage with pins 29 projecting from the adjacent face of housing 2 in a fashion similar to shell 23 in the first described construction. A set-screw 27a serves to secure the ring non-rotatably to the work when properly positioned on pins 29. There will be a different ring for each diameter of work, one ring being slipped off and another on whenever change is necessary.

The electric motor employed to drive our improved tool is of the so-called universal type in that it is adapted to operate both on A. C. and D. C. current. An additional characteristic of this type of motor, which is of importance in the present connection, is that instead of operating at a constant speed, the speed thereof will automatically vary to suit the load. Thus, by way of illustration, in the case of a particular machine in which the motor is designed to produce a speed of 11 to 12 R. P. M. when threading a one inch pipe, the characteristics of the motor are such that when threading a three-fourths inch pipe, the speed automatically goes up to 16 R. P. M., while in threading pipe from one-half to one-fourth inch in diameter, the speed of the motor will be approximately 20 R. P. M. If instead of such a universal motor having characteristics as stated, a constant speed motor of the type generally used on machine tools were employed, it will obviously be necessary to have a number of change gears incorporated in the machine in order to attain these various speeds.

For convenience in manipulating the tool, two oppositely disposed handles 30 are provided, as shown in Fig. 2, these being attached at their lower ends to casing 10 and at their upper ends to corresponding sides of casing 2. The electric current is carried to the motor through a line switch 31 operated by a lever 32 disposed adjacent the upper end of one such handle 30, a reversing switch 33 being located adjacent the lower end of such handle with its lever 34 likewise disposed so that it may be manipulated by the hand which holds the handle in question.

It should be apparent that the tool need not be necessarily held to the work by means of the work engaging device of the type hereinbefore described. Thus, as shown in Fig. 4, the device in question may take the form of a simple work centering or guiding device such as is regularly found in a hand operated die stock. In adapting such device to the present construction, the end wall 35 of housing 2 is formed with an integral extension 36 in which radial guides 36b are held, these being adjustably positioned by means of a rotatable cam plate 36a. A further modification feature is illustrated in Fig. 4 in that the die head 39, corresponding with die head 25, is arranged so as to be detachably secured to the tubular shaft 3 by means of a spring pressed plunger 40, the inner end of said plunger engaging an opening 41 in the portion of the shaft that projects beyond housing 2 when the die head is properly positioned on such shaft end. Accordingly, when it is desired to change one die head for another, it is merely necessary to lift plunger 40 by means of its knurled head 42 until said plunger clears opening 41. Another die head may then be readily substituted with different dies 42, whether of the chaser or other type.

In utilizing a tool of the construction shown in Fig. 4 and just described, the work will be held in a vise or the like with the end to be threaded conveniently disposed so that the tool may be slipped thereon and properly centered by rotating cam 36a. The tool of course will require to be not only held to the work, but also held against rotation by the operator, but this is not a heavy task where a thread of small diameter is being cut.

Where the tool is non-rotatably secured to the work, other means may be provided than the directly slidable work-engaging constructions shown in Figs. 1 and 3, respectively, whereby the die head may advance longitudinally of the work as is necessary incidentally to the threading operation. Thus, in Fig. 5, a work engaging device 45 of the type shown in Fig. 1 is attached to a cylindrical shell 46 which is slidable within a second shell 47 that corresponds with tubular shaft 3, a spline 49 serving to lock the two shells against relative rotation but permitting longitudinal movement therebetween. The die head 50 instead of being attached to shell 47, thus seen to correspond with tubular shaft 3, is directly attached to the face of housing 2. When this form of tool is attached to the work by non-rotatably clamping device 45 thereto, rotation of beveled gear 5 will tend to rotate the work with respect to the die head, assuming that casing 2 is held against rotation as by grasping the handles provided for this purpose, inasmuch as said gear is keyed to shell 47 and the latter is in effect keyed to shell 46.

In Figs. 6 and 7, the modification consists in so attaching the die head that it may slide longitudinally with respect to the body of the tool. A work engaging device 51, again of the same type as shown in Fig. 1, is employed except that such device is incorporated in an extension of end wall 35 of housing 2. The construction in this respect is identical with that in Fig. 4 except that one of the guides includes a threaded pin as in Fig. 1 whereby rotative movement between the work and the device is prevented. The die head 25 instead of being attached directly to the forward end of tubular shaft 52, that corresponds with shaft 3 in Fig. 1, is attached to the forward end of a second tube 53 or 53a that is splined to said tube 52 so as to be non-rotatable relatively to the latter but free to move longitudinally thereof. It will be noted that shell 53 (Fig. 6) fits interiorly of tubular shaft 52, while shell 53a (Fig. 7) fits exteriorly of said tubular shaft.

Finally, in Fig. 8 we show still another modification in construction in which the tubular shaft 55, corresponding with tubular shaft 3 of the first described construction, is capable of sliding movement relatively to beveled gear 5. To this end, said shaft is splined in the gear, the groove 56 in the shaft, wherewith the key 57 engages, being of sufficient length to permit the desired longitudinal movement of the shaft, as will be readily understood. The work engaging device 58, just as in the case of work holding device 51 in Fig. 6, is of a type which is adapted to be non-rotatably clamped to the work.

The operation of the three modified forms illustrated in Figs. 6, 7 and 8 is similar in that the housing 2, and thus the tool in the main, is held against rotation with respect to the work by virtue of the locking engagement which the work engaging device has with such work. Movement of the die head 25 inwardly along the work as the threading operation progresses incidentally to rotation of the tubular shell 52 or 53, corresponding with tubular shaft 3, will accordingly be permitted, this movement being possible by virtue of the splined connection between shell 53 or shell 53a with shell 52 in the case of Figs. 6 and 7, and by virtue of the direct splined engagement between shell 55 and the beveled gear 5 in the case of Fig. 8.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In a portable power driven tool, the combination of a housing; a tubular shaft rotatably mounted in and extending through said housing; a tool carried by one end, and a work engaging device by the other end of said shaft; an encircling shoulder on said shaft adapted to prevent endwise movement thereof with respect to one wall of said housing; a bevel gear rotatably fixed on said shaft between such shoulder and the opposite wall of said housing, said gear facing such first-named wall; a thrust bearing interposed between the back of said gear and such second wall; a radially disposed spindle journaled in said housing; a bevel pinion fixed on said spindle and meshing with said gear; a motor attached to said housing with its spindle in alignment with said first-named spindle; and reduction gearing interposed between said spindles.

2. A self-contained hand-portable device of the character described, which comprises a motor, a casing supported thereon, a tubular shaft rotatable in said casing, a die-holder mounted on one end of said shaft, work-engaging means at the other, an encircling shoulder on said shaft, a bevel gear on said shaft between such holder and the wall of said casing, a thrust-bearing back of said gear, a detachable cover plate for giving access to said bearing and gearing, a radially-disposed spindle carrying a pinion meshing with said gear, and driving connections between said motor and said spindle including reduction gearing.

3. In a power-driven portable threading machine, in combintaion, a main casing, a motor and a motor-driven train of reduction gears, an auxiliary casing mounted on the end of the main casing, a sleeve rotatably mounted in the auxiliary casing, stocks and dies and a pipe guide mounted on opposite ends of the sleeve, a bevelled ring gear fixed to the sleeve at a point between the pipe guide and stocks and dies, and a bevelled pinion gear actuated by said train of gears disposed to engage the ring gear when the auxiliary casing is in position on the main casing, the axis of the main casing extendng substantially at right angles to the axis of the sleeve, whereby the casing may be used as a lever for holding the machine during the operation of the stocks and dies.

4. In a portable threading machine in combination, a main casing, a motor and motor driven train of gears, a bevelled pinion gear driven by the train of gears, said pinion extending beyond the casing, an auxiliary casing on the main casing, a sleeve rotatably mounted in the auxiliary casing, a set of stocks and dies and a pipe guide mounted on opposite ends of the sleeve and a bevelled ring gear fixed to the sleeve between the guide and dies, said ring gear being disposd to engage the pinion when the auxiliary casing is mounted in position on the main casing.

5. In a portable threading machine in combination, a main casing, a motor and a motor-driven train of gears, a bevelled pinion gear driven by the train of gears, said pinion extending beyond the casing, an auxiliary casing on the main casing, a sleeve rotatably mounted in the auxiliary casing, a set of stocks and dies and a pipe guide mounted on opposite ends of the sleeve and a bevelled ring gear fixed to the sleeve between the guide and dies, said ring gear being disposed to engage the pinion when the auxiliary casing is mounted in position on the main casing, said main casing extending at substantially right angles to the sleeve, and handle means in association with said main casing.

Signed by us this 5th day of November, 1924.

HERMAN W. OSTER.
GLENN D. SLEETH.